United States Patent Office 3,179,141
Patented Apr. 20, 1965

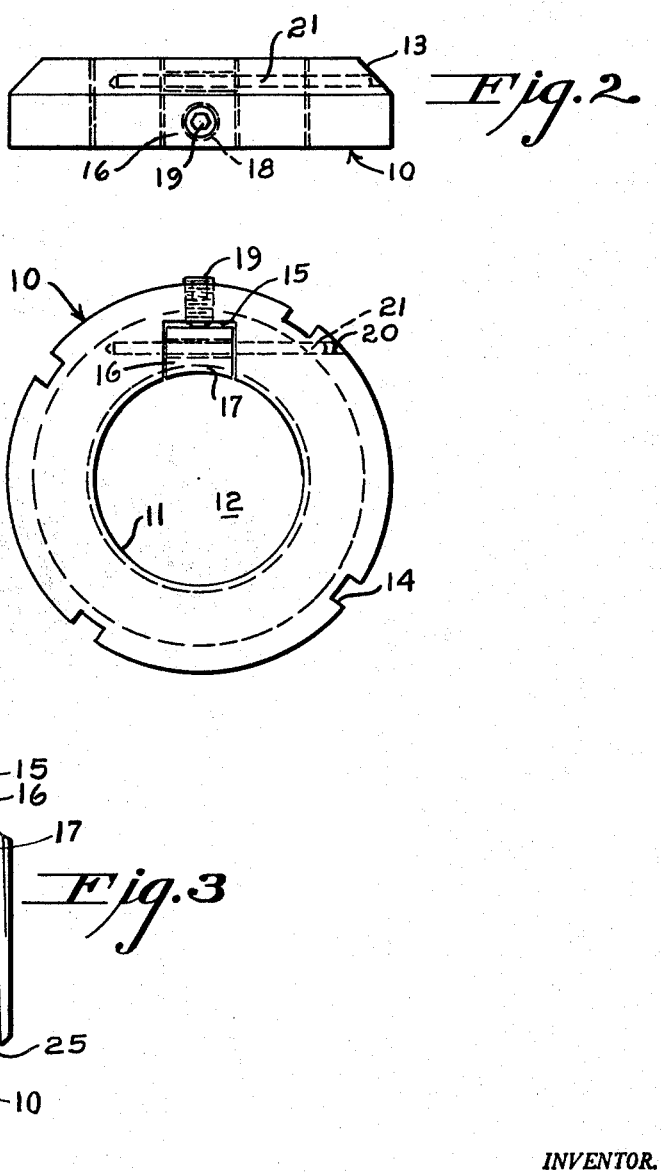

3,179,141
LOCKNUT
Robert G. Folmar, Painted Post, N.Y., assignor to Corning
Glass Works, Corning, N.Y., a corporation of New
York
Filed June 1, 1962, Ser. No. 199,525
1 Claim. (Cl. 151—24)

This invention relates to an internally threaded device which may be securely locked or retained in any desired position along an externally threaded member, and more particularly to an improved locknut having an internally threaded cylindrical surface provided with an arcuate portion which is movable transversely of the longitudinal axis of the internally threaded cylindrical surface.

Various locknuts have been suggested in the past wherein locking has been accomplished by such means as: deforming the threads thereof when the nut is tightened against a workpiece; utilizing pointed or irregular edges to bite into the workpiece when the nut is tightened thereagainst; and utilizing special lock washers. In all of the known devices it is necessary that the locknut be brought into contact with another nut, workpiece, or other rigid device, in order that it may be secured or locked in position. Accordingly such known locknuts cannot be securely positioned in any predetermined or desired location along a threaded shaft, unless they abut another object.

It thus has been an object of my invention to provide an improved locknut which may be securely fastened in any desired position along an externally threaded shaft.

A further object of my invention has been to provide a perforated member having an internally threaded cylindrical surface, a portion of which may be offset to form a surface area contact with the threads of an externally threaded member under a force normal to the longituding axis of the cylindrical surface, so that the perforated member may be secured in any desired location on the externally threaded member.

A further object of my invention has been to provide an improved locknut having an arcuate portion of its internally threaded surface movable transversely with respect to the longitudinal axis of the nut so as to be brought into compressive engagement with an externally threaded portion of a shaft.

These and other objects of my invention will be apparent to those skilled in the art from the following disclosure and accompanying drawings in which:

FIGURE 1 is a plan view of an improved locknut embodying my invention;

FIGURE 2 is a side elevational view of the improved nut shown in FIGURE 1; and

FIGURE 3 is a side elevational view in section of an assembly illustrating the utilization of a bearing locknut, embodying my invention, for positioning a bearing on a shaft.

Bearing locknuts, utilized in the past to secure ball bearing assemblies and the like to shafts, have necessitated the utilization of such devices as set screws which multilate the threads making them useless, or special lockwashers provided with bendable tabs or ears which fold down into specially formed recesses positioned about the outer periphery of the locknut. Such lockwashers are provided with an inwardly extending key which fits into a special keyway which must be cut into the threaded shaft upon which the bearing locknut is applied. This type of bearing locknut has not been entirely successful due to the fact that the ears or tabs formed on the lockwasher have a tendency to break off after a period of time. Also, since the tabs must complement the recesses formed in the periphery of the locknut to provide a locking action, it frequently becomes necessary to back-off or loosen the nut after tightening, in order that the tabs will fit within the recesses.

Although the present invention is illustrated in the form of a bearing locknut, it will be readily apparent to those skilled in the art that the shape or configuration of the outer periphery of the locknut may be varied from round to square including all of the intermediate polygonal configurations such as hexagonal, octagonal, etc.

Referring now to the drawings, a locknut or perforated member 10 is shown having an interanlly threaded cylindrical surface 11 surrounding the periphery of hollow portion 12. If desired, the nose of the nut 10 may be beveled as shown at 13, and in the case of a round nut, recesses 14 may be provided in the outer periphery of the nut for a spanner wrench and the like.

A radially extending recessed portion 15, opened to the hollow portion 12 and communicating with cylindrical surface 11, is provided with a movable or pivotable block 16 having an arcuate threaded portion 17 positionable to complement the internally threaded cylindrical surface 11. A threaded bore 18 communicates between the back surface of the recessed portion 15 and the outer periphery of the nut 10, and is provided with a suitable setscrew 19 such as an Allen screw. A bore 20 extends into the body portion of the nut 10 and through the movable block 16. A pin 21, positioned within bore 20, is retained in place by any suitable means such as a press fit, end crimp, etc.

Referring now to FIGURE 3, a locknut embodying my invention is shown retaining a ball-bearing assembly 22 in position against a shoulder 23 of a shaft 24. The shaft is provided with an externally threaded portion 25 upon which internally threaded cylindrical surface 11 and arcuate surface area portion 17 engage. When the nut 10 is in the desired position, the setscrew 19 is tightened in the threaded bore 18 and presses against the back surface of the movable block 16. The block is thus pivoted about the pin 21 radially inwardly of the nut and transversely of the longitudinal axis of the threaded cylindrical surface 11 so that surface area contact is made between the arcuate threaded portion 17 of the movable block 16 and the externally threaded portion 25 of the shaft 24. The amount of force or pressure applied to tighten and securely clamp the locknut 10 in the predetermined position on the threaded shaft 25, may be adjusted by turning screw 19.

It thus can be seen from the above that my improved locknut may be securely retained on an externally threaded member at any desired location therealong since the locking action is effected by a surface area compressive force applied transversely of the longitudinal axis of the nut, and accordingly the longitudinal axis of the threads, rather than a thread distorting shear force exerted parallel to the longitudinal axis of the threads, such as is normally effected by known types of locknuts when they are tightened against an object.

Although I have disclosed a preferred embodiment of my invention it will be readily apparent to those skilled in the art that various changes and modifications may be made thereto without departing from the spirit and scope of the invention as defined in the appended claim.

I claim:

An improved locknut having an internally threaded cylindrical surface positionably retainable at any desired location along an externally threaded shaft by offsetting an arcuate portion of the internally threaded cylindrical surface of said nut so as to form a compressive area contact with the threads of the externally threaded shaft in a direction normal to the longitudinal axis of said shaft which comprises, a body portion having opposite end surfaces and an outer continuous periphery of desired configuration and an internally threaded cylindrical inner peripheral surface, a recess formed in said body portion extending from end surface to end surface parallel to the nut axis and communicating with said inner peripheral surface, a movable block retained within said recess and having a threaded arcuate face positionable to complement said internally threaded cylindrical peripheral surface so as to form a portion of the area of such surface, a transverse bore extending through said movable block and longitudinally spaced from the center of said block, a complementary bore formed in said body portion communicating with opposite sides of said recess and with the outer periphery of said nut, pin means extending through said tranverse bore and within said complementary bore retaining said movable block in said recess for limited movement transverse to the longitudinal axis of said nut, set screw means threaded radially through said body portion and engaging with said block at a point longitudinally spaced on the opposite side of the center of the block from said bore and pin for urging said movable block and accordingly its threaded arcuate surface area portion inwardly toward said longitudinal axis so as to compress the threaded area portion of said block against the external threads of the shaft upon which the nut is mounted to provide a locking force in a direction normal to the longitudinal axis of such shaft, and said latter means maintaining a predetermined pressure on said block so as to lock said nut on such shaft.

References Cited by the Examiner
UNITED STATES PATENTS

| | | | |
|---|---|---|---|
| 189,747 | 4/77 | Kennard | 151—24 |
| 594,525 | 11/97 | Douglass | 151—24 |
| 738,008 | 9/03 | Decker | 151—24 |
| 951,800 | 3/10 | Center | 151—25 |
| 1,000,994 | 8/11 | Cox | 151—24 |
| 1,573,328 | 2/26 | Sale | 151—24 |
| 2,280,270 | 4/42 | Stoner | 151—24 |
| 2,694,430 | 11/54 | Andershock. | |

EDWARD C. ALLEN, *Primary Examiner.*